July 30, 1935.   W. J. PODBIELNIAK   2,009,814
METHOD AND APPARATUS FOR ANALYZING LIQUID AND GAS
Filed April 1, 1929   2 Sheets-Sheet 2
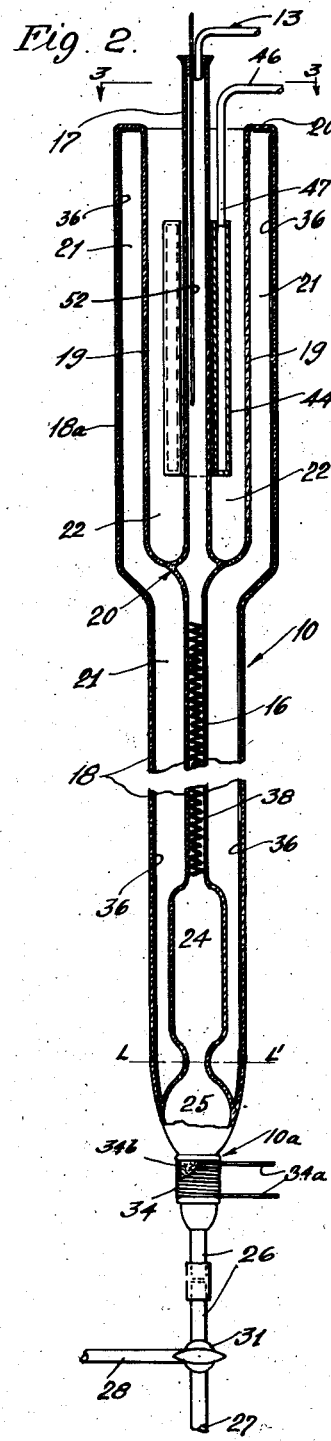
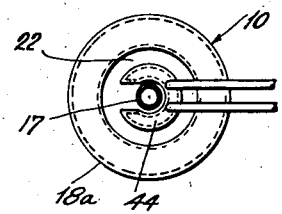
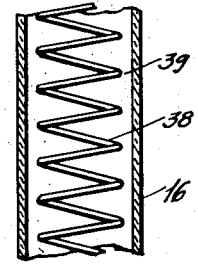
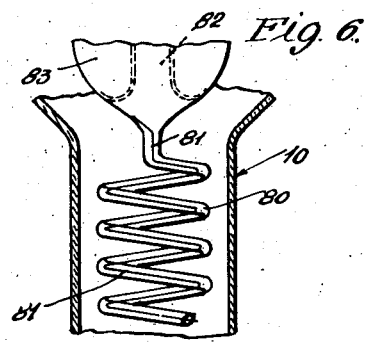
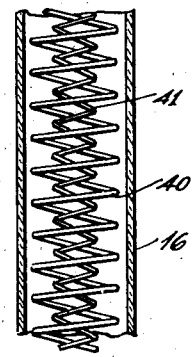
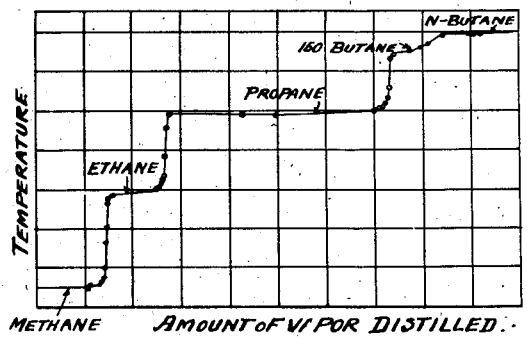
Inventor.
Walter J. Podbielniak.

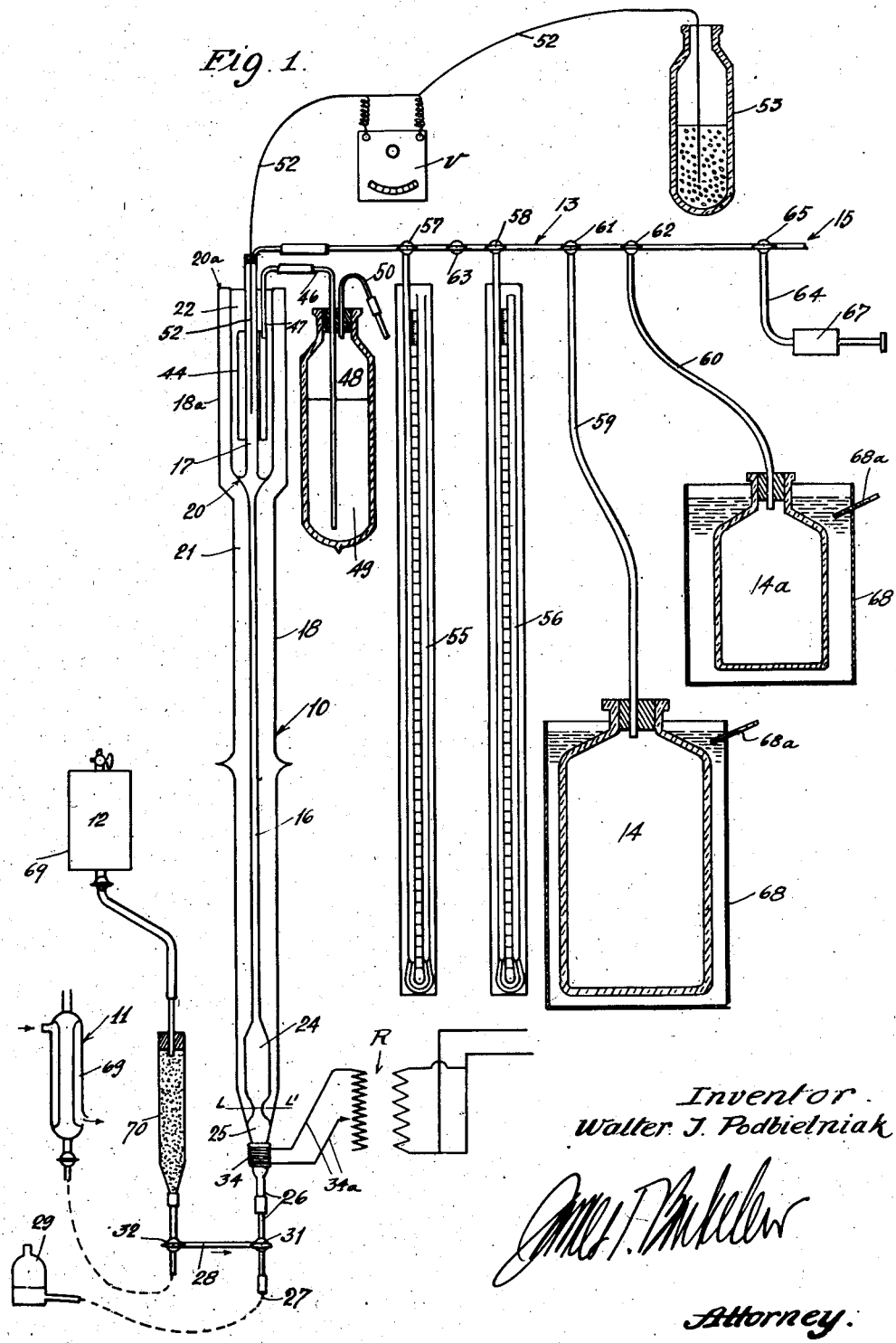

Patented July 30, 1935

2,009,814

UNITED STATES PATENT OFFICE 2,009,814

METHOD AND APPARATUS FOR ANALYZING LIQUID AND GAS

Walter J. Podbielniak, Long Beach, Calif.

Application April 1, 1929, Serial No. 351,726

18 Claims. (Cl. 23—232)

This invention has to do with method and apparatus for the analysis of volatile liquids, liquid and gaseous mixtures, and gases containing condensible liquid fractions, such as certain of the artificial gases and natural gas. The present method of analysis is particularly suited to the testing of natural gasoline and natural gas, and therefore as a typical adaptation, I shall hereinafter describe the invention as applied to the analysis of these substances.

Generally speaking, my system of analysis comprises first the conversion of the fluid to be analyzed into liquid and vapor fractions, under conditions most suitable for this operation, after which the fractionated products are quantitatively determined under conditions particularly suited to their quantitative measurement. Heretofore, methods of analysis embodying the general procedure of fractional distillation followed by quantitative product measurement in which the products of fractionation are measured in the liquid phase, have necessitated the use of analytical apparatus which is comparatively complicated and difficult to operate due to the accuracy required in the fractional distillation stage, and the necessity for subsequently condensing and measuring the difficultly condensible products. According to the present system of analysis, the material to be tested is first subjected to vaporization and rectification in the analysis of liquids, and in the analysis of gases, to condensation, vaporization and rectification, to separate the volatile constituents, but instead of condensing the separated and fractionated constituents as heretofore practiced, they are subjected to such conditions of temperature and pressure as to permit their being maintained and measured in the vapor phase. As will later be seen, it is not required that the vaporized products be physically separated in order to accomplish their individual quantitative determination, but instead, the fractionated vapor may be passed to a common container of predetermined capacity, and by noting the temperature, corrected in accordance with the pressure of the fractionated vapors leaving the fractionating unit, and simultaneously the temperature and pressure conditions in the container, thereby arriving at a quantitative determination of the vapor products, the successive fractionated products are thus measured in continuous operation. The individual products of fractionation are identified according to their respective temperatures of vaporization at given pressure.

To outline more specifically the successive steps followed in the analysis of a gasoline or gas sample, the sample is first delivered to a previously evacuated fractionating column provided with a reflux condenser, the latter usually being maintained during the intake of sample to the column at a temperature sufficiently low to reduce the vapor pressure of the volatile fractions of the sample, for instance, to atmospheric, or any other selected operating pressure, or in other words to condense these fractions as reflux in the column. In the analysis of an extremely volatile fluid it is possible to control the operation of the fractionating column in a manner such that the heat removed from the vapor by cooling in the reflux condenser is in excess of that put into the liquid, thereby enabling the column to operate at subatmospheric temperature.

After entering the sample to the column, vaporization and rectification follow, preferably at about atmospheric pressure, the fractionation being carried out so that the hydrocarbons are distilled from the column in the order of their boiling points and in substantially pure state, as may be determined by the temperature of vapors leaving the column. The uncondensed vapor is then collected in an evacuated container of predetermined volume, and frequent simultaneous readings are taken of the column outlet vapor temperature and the pressure and temperature of the collected vapors in the container, these readings thus providing data for plotting a fractional distillation curve from which the percentages of the various fractions may be calculated.

A further feature of the invention resides in the particular type of fractionating column employed, the latter being of such efficiency as to effect unusually sharp fractionation of the material being distilled. The above and numerous additional features and advantages of the invention will be readily and clearly understood from the following detailed description of an embodiment thereof, reference being made to the accompanying drawings in which:

Fig, 1 is a diagrammatic illustration of the apparatus used for carrying out the present method of analysis;

Fig. 2 is a broken, longitudinal section through the fractionating column, on enlarged scale;

Fig. 3 is a plan view of the column taken on line 3—3 of Fig. 2;

Fig. 4 is an enlarged fragmentary view showing a section of the fractionating tube containing a preferred form of packing;

Fig. 5 is a view similar to Fig. 4 illustrating another type of packing that is suitable for use in the fractionating tube;

Fig. 6 is a fragmentary view illustrating a modified form of distillation tube and packing; and Fig. 7 illustrates a typical distillation curve plotted from data obtained during an analysis or run.

The system shown in Fig. 1 embodies a fractionating column generally indicated at 10, adapted to be supplied with liquid or gaseous samples to be analyzed from supply sources 11 and 12, respectively. Vaporized and uncondensed fractions of the samples are passed from the fractionating column through the manifold 13 to suitable containers 14, 14a, of known volume. In practice it may be desirable to provide the illustrated apparatus in duplicate and to continue the manifold 13 from the point 15 to provide a single continuous manifold for both sets of apparatus, thereby enabling one unit of the equipment to be used in the analysis of liquid and the other for analyzing gas. The manner of operation of a unit such as that shown, however, is essentially the same for the analysis of both liquid and gases, and therefore the description will be confined to a single complete unit.

The fractionating column 10 includes an elongated fractionating tube 16 which, for example, may be about 60 cm. in length and about 5 mm. in diameter, the fractionating tube being extended to form a reflux or condenser tube 17. Tube 16 is surrounded by a jacket 18, the upper portion 18a of the latter, surrounding the reflux tube, being enlarged as illustrated. An inner wall 19, spaced from the jacket portion 18a to form an annular reflux chamber 22, is joined at 20 to the upper end of tube 16 and at 20a to the upper end of the outer jacket, thereby providing an enclosed space 21 surrounding the fractionating tube and also the annular reflux chamber 22. Space 21 is evacuated as completely as possible, thereby providing an effective thermal insulation for the fractionating tube and reflux chamber. The described parts of the fractionating column are of course formed of a suitable glass, for instance pyrex.

The lower end of the fractionating tube is enlarged to form a distilling bulb 24, a second enlargement 25, which may be termed the displacement bulb, being formed below the distilling bulb. Chamber 25 communicates through tube 26 with tubes 27 and 28, the former leading to the mercury bottle 29, and the latter to the liquid sample container 11 and the gas sample container 12. Three-way cocks 31 and 32 are provided for controlling the flow through tubes 27 and 28 as will later be described.

Heat is supplied to the contents of chamber 25 by means of the heating element 34, preferably comprising high resistance wire wound around an asbestos layer 34b placed about the lower end 10a of the column. The current supply wires 34a lead from the heating element to the conventionally illustrated rheostat R, by means of which the heat supplied to the column may be controlled with accuracy. An internal heating element may be provided within the column below chamber 25, instead of the external heating element as shown; however, the latter has been found preferable since an internal element may be readily short-circuited and is difficult to keep clean. Furthermore, an internal element necessitates considerable enlargement of the displacement bulb and undue exposure to room temperature.

It is preferred that the jacket 18, 18a be silver-plated, with the result that the thermal insulation is greatly increased over that effected by the evacuated space 21. It will be understood that any suitable heat reflecting material such as silver, platinum, etc., may be employed in providing a semi-transparent plating for the column, silver being preferred. Heretofore silver plating has been resorted to in improving the thermal insulation of containers, there usually being provided a comparatively heavy silver plate through which the interior of the container cannot be viewed. In the present instance, however, it is necessary during the operation of the apparatus, that the operator be enabled to observe at all times the conditions within the distillation tube, and therefore it is desirable that the insulating jacket be transparent at least to a certain degree. In order to permit visibility of the distilling tube and yet provide additional thermal insulation, there is deposited by a suitable silvering procedure, a semi-transparent silver film 36 on the jacket, the film serving to increase the thermal insulation about three times, and yet being sufficiently thin that visibility of the fractionating tube is permitted, an ordinary flash light usually being used to observe operations in the interior of the tube. Due to the improved thermal insulations of the column by virtue of the silver plate, liquefied gas may be retained in the distilling bulb and in the column without excessive boiling and priming, and in the case of gas analysis, a greater quantity of gas may be passed into or through the column per unit of time, inasmuch as adequate cooling of the gas stream is effected to condense and retain in the column the desired liquid constituents. Since the silvered column is practically adiabatic in operation, the fractionation achieved thereby is considerably improved over that possible using a non-silvered column.

As shown in Fig. 4, the preferred type of packing contained in the fractionating tube comprises the coil 38, the latter being spaced from the inner wall of the tube at 39. The diameter and pitch of the coil are adjusted to secure the greatest capillary film effect of the reflux liquid between the coil turns and between the packing and the tube wall, thereby providing for its maximum contacting with the ascending vapors. In Fig. 5, another similar form of packing is shown in which the outer coil 40 encloses a second oppositely wound coil 41, the spacial arrangement thereof being such that capillary films may be formed between the turns of the coil and between the outer coil and the tube wall. By the use of packing of this nature in a distillation tube of small bore to produce capillary films, I secure intimate contact between the reflux liquid and ascending vapors, and at the same time prevent lag in the column operation by minimizing liquid hold-up in the distillation tube I thereby secure sharp separation between successive fractions.

In Fig. 6 I have illustrated a modification in the construction of the fractionating column, the purpose of this form being to increase the effective length of the distillation tube without necessarily increasing the overall length of device. In this modification, the distillation tube 80 takes the form of a spiral, the pitch and tube diameter of which is such that the rate of downward flow of the reflux therethrough is sufficiently slow to insure thorough contact with the rising vapors, yet sufficiently rapid to prevent obstructing the flow of vapors and retaining such quantities of liquid in the tube as to cause appreciable lag in the operation of the column. The packing in this form of distillation tube comprises the wire 81 threaded continuously through the coil, the wire serving the same general purpose as the spiral coil in the previously described straight tube, in producing a capillary film effect. The lower end of the tubular coil (not shown) opens into a distilling bulb of the form shown in Figure 2, the upper end of the coil leading into the reflux tube 82 within the reflux chamber 83.

The reflux chamber 22 contains a suitable liquid which is substantially non-freezing within the temperature range of cooling required, such as lighter gasoline or natural gas fractions. To maintain the reflux chamber liquid at a low temperature, there is provided a cooling vessel 44, shaped as illustrated in Figs. 2 and 3, the vessel being spaced from the jacket wall 19 and from the reflux tube, and partly surrounding the latter. Vessel 44 is cooled, for example by circulating or blowing a suitable refrigerant therethrough, and for this purpose there are provided inlet tube 46 and outlet 47 communicating with a thermos bottle 48 containing liquid air 49. The desired amount of the refrigerant is supplied in vessel 44 by applying air pressure to the bottle through tube 50. The refrigerant expands in the cooling vessel 44 to secure the desired cooling effect.

Accurate reading of the temperature of vapor flowing from the reflux tube to the manifold 13 is indicated by millivoltmeter V in the circuit of thermocouple 52, a refrigerant or cold liquid in thermos bottle 53 providing a cold junction for the thermocouple.

Manometers 55 and 56 are provided for measuring the pressures in the fractionating column and receiving bottle respectively, cocks 57 and 58 being provided at the junction of the manometer tube with the manifold. Receivers 14 and 14a communicate with the manifold through tubes 59 and 60, respectively, three-way cocks 61 and 62 being provided at the junction of these tubes with the manifold. A regulating cock 63 is placed in the manifold between cock 57 and 58, the regulating cock being adjustable to control the rate of distillation from the fractionating column as will be described hereinafter. Beyond cock 62 is an exhaust line 64 leading into the manifold through the three-way cock 65, line 64 leading to the vacuum pump 67 by means of which the fractionating tube, manifold connections and the receiving vessels may be evacuated before starting the analysis.

It is found convenient to provide a receiving vessel 14 of comparatively large capacity and a second receiver 14a of smaller capacity, the vapor from gas analysis ordinarily being delivered to the smaller container and the vapor from liquid analysis to the larger. In other words, the largest container is used in cases where the volume of the vaporized products from the fractionating column is apt to be great, thereby doing away with the necessity of frequent evacuations of the receiver to maintain the desired pressure differential between the column and receiver. The smaller container is used in an analysis where the vapor volume is comparatively small in order that the pressure rise per given amount of vapor passed into the receiver may be sufficiently great for the desired accuracy of measurement. As will later be described, the amount of vapor collected in the receiver is calculated from the known capacity of the receiver and from the pressure and temperature of the vapors therein, and therefore it becomes necessary that the temperature in the receivers remain as nearly constant as possible, inasmuch as temperature changes introduce error or necessitate troublesome corrections. For this reason the receivers are immersed in liquid contained in tanks 68, and the liquid is maintained as nearly as practicable at a suitable constant temperature, measured by thermometers 68a.

I will describe first the procedure followed in the analysis of a sample of natural gasoline. The latter usually being highly volatile at ordinary temperatures, it may be desirable to cool the sample before introduction to the fractionating column, and for this purpose I have shown the sample container 11 surrounded by a jacket 69 through which a suitable cooling agent, such as carbon dioxide, may be expanded. Before introducing the sample to the column, the apparatus is evacuated and the reflux chamber cooled by blowing liquid air through the cooling vessel. Stop-cock 63 being then closed, stop-cocks 31 and 32 are turned to admit the desired quantity of liquid to the distilling bulb 24, both cocks being closed when a sample of the desired size has been put into the column. Stop-cock 31 is then turned to admit mercury from bottle 29 to tube 26, and by elevating bottle 29, mercury is caused to rise within the column and into bulb 25, thereby displacing the sample into the distilling bulb 24. The mercury may be considered as standing at a level L—L', although it may be maintained at other levels, and it will be noted that the entire sample is contained within bulb 24, the latter being highly insulated from atmospheric heat; and by excessive cooling of the reflux, as previously mentioned, the distillation may be started at a temperature below atmospheric. The heat supplied to the sample for distillation from element 34 is conducted through the body of mercury in the displacement chamber 25. It may be noted at this point that the amount of the sample is calculated from the measured amount of vapor distilled during the run and from the amount of residue removed from the column at the end of the distillation.

After introducing the sample to the column, the pressure therein is somewhat below atmospheric, and, in starting the distillation, pressure in the column is preferably brought to approximately atmospheric by applying heat to the mercury in the displacement bulb by means of the rheostat-controlled heating element. In building up the pressure in the fractionating column to the desired degree, stop-cock 63 remains closed and the vapors rising within the column are condensed in the reflux tube 17. If the sample is of such volatility as to vaporize or boil excessively at room temperature or to such an extent that it becomes difficult to avoid flooding the column, the pressure may be allowed to rise somewhat above atmospheric. Again, should the vapor temperature rise above room temperature before the pressure in the column builds up to the amount desired, it may be necessary to start the distillation at a lower pressure, since otherwise the vapor delivered from the column would condense in the manifold connection.

When conditions are satisfactory within the column, distillation is started by cracking the regulating cock 63 to allow the fractionated vapors to pass slowly into receiver 14, cocks 57 and 58 being opened and cock 62 closed. It will be noted that cock 63 corresponds, in effect, to a throttle valve whereby the rate of distillation is controlled. Frequent simultaneous reading of the milli-volt-meter V, indicating the fractionated vapor temperature in the column, and the manometer in the column and the manometer 56, indicating the pressure in the receiving bottle, are recorded, from which data the operator later constructs a graph of vapor temperature (corrected to a standard pressure) against the amount of vapor distilled. When a rapid rate of distillation is maintained, the vapor flow through the manifold may be of such velocity as to cause the pressure indicated by manometer 56 to differ from the actual gas pressure in the receiver, and to eliminate this error stop-cock 58 may be turned momentarily to obtain a pressure reading with no flow of vapors through the manifold. Should the fractionating column flood at any time, the distillation may be immediately stopped, as by closing stop cock 58 or 63 until the column is again operating properly.

As the distillation proceeds, it will be noted that the vapor temperature remains almost constant for a relatively long period, assuming of course that the pressure is maintained constant. This indicates that one of the volatile hydrocarbon constituents is being fractionated from the sample with but slight contamination. After most of this particular hydrocarbon has been distilled, the vapor temperature tends to rise, and this rise in temperature should be prevented by adjusting cock 63 to retard the rate of distillation, thereby increasing the reflux ratio to improve the fractionation at the end point of that particular fraction. In controlling the operation of the system, it may be stated that the rate of distillation is controlled by the regulating cock, the pressure and degree of fractionation in the column being controlled by the regulating cock, amount of heat input, and cooling of the reflux. The same general procedure is followed as described, during the fractionation of each of the individual constituents.

The fractions are thus distilled off one by one until the volatility of the residue left in the distilling bulb is such as to render further distillation tedious and impractical, due to the frequent evacuation of the receiving bottle necessary to maintain a pressure sufficiently low to prevent condensation of the distillate in the manifold connections and in the receiver. At this point the distillation is stopped, cock 58 closed and heating and cooling in the fractionating columns discontinued. After the column packing is completely drained, the column is vented to the air and the liquid residue discharged to a suitable measuring container. By calculating the amount of vapor in the receiver and connections, that amount added to the measured quantity of residue from the column indicates the size of sample originally distilled. It will be understood that at no time during the analysis does the vapor pressure in the container 14 exceed what may be termed the "condensation pressure" of the gas at the temperature in the container, that is, the pressure above which condensation of any of the vapors could take place.

In the analysis of a natural gas sample, receiver 14a is used. The apparatus is evacuated, and after evacuation of receiver 14a to the desired extent, cock 62 is turned and pumping of the column continued. In order to gain accuracy in the analysis of a gas sample, it is desirable that the sample be of considerable volume, and especially in case the gas is dry. In other words in testing gas containing comparatively low amounts of the heavier hydrocarbons such as pentane and hexane in natural gas, it may be necessary to handle a fairly large sample in order to retain in the column a considerable volume of condensate for distillation. The gas sample may be taken from any desired source, for instance, a measured sample of gas is held in the container 12, the latter being of smaller capacity than the receiver 14a, and the gas pressure preferably being at or above atmospheric. After purging line 28, having opened cock 31, evacuation of the apparatus is discontinued, cock 58 turned to connect the receiver with manometer 56, and regulating cock 63 is turned to cut off the fractionating column from the remainder of the apparatus. A mercury seal is then formed in the column immediately below the heating element by permitting mercury to rise from the leveling bottle 29.

Cock 32 is then cracked to allow gas from the sample bottle 69 to flow into the apparatus through the drying tube 70, the gas bubbling through the mercury seal as it passes into the fractionating tube. During the introduction of gas to the column, the pressure therein builds up to atmospheric or greater, and the heavier fractions are condensed as reflux in the upper part of the column, the reflux bath being kept at the lowest temperature possible in case the gas sample contains highly volatile fractions such as methane. Condensation in the reflux tube is continued throughout the period of feeding gas into the column, and the condensible fractions of the gas are continuously condensed so that the column pressure does not build up to an excessive degree. In case the pressure should tend to build up abnormally, fixed gases may be taken off to the receiver until the entire gas sample is put into the column. After feeding the gas sample to the column, cock 32 is closed and the condensed fractions of the gas contained in the distilling bulb 24 are subjected to fractional distillation according to the previously described procedure followed in the analysis of gasoline. The column pressure being maintained below the condensing pressure of the fractions being distilled, no condensation occurs in the manifold and receiver.

In case the gas sample contains but a low percentage of condensible vapors, it is desirable to put through the column a large sample of the gas and to analyze the heavy hydrocarbon liquid concentrate. To avoid filling the distilling bulb and fractionating tube with condensate, most of the methane and lighter gases may be allowed to pass from the top of the column while only the comparatively heavy fractions are condensed as reflux. It may be added that should a large gas sample be available, and after the column is once primed with reflux, it is possible to conduct the distillation in a manner such that not only the heavier fractions but also a considerable proportion of the lighter fractions present in the sample may be retained in the column, while the non-condensible portion of the gas is distilled off during the entry of the sample. Calculations for the conversion of vapor in the receiver to liquid volume are based upon the ideal gas laws. Although the heavier hydrocarbon vapors do not strictly follow the ideal gas laws, especially in the neighborhood of their condensing pressure, the error introduced is ordinarily within the limits of permissible error for practical results. However, the possibility for error may be lessened considerably by taking care that the vapors are collected at a partial pressure considerably lower than their condensing pressure at the temperature of the bath.

In the analysis of extremely volatile gases containing relatively large amounts of fractions such as methane which require an extremely low temperature refrigerant, such as liquid air, for their condensation, a refrigerant of this nature may not be available. It is possible, however, to modify the analytical procedure somewhat in order to analyze these gases when having available a refrigerant not capable of condensing the more volatile fractions by themselves. Thus, before entering the gas sample to the fractionating column, the latter may first be primed with a liquid, the vapors from which the particular refrigerant being used in the reflux chamber is capable of condensing. It may be assumed, for instance, that the distillation tube is first primed with a suitable quantity of propane, carbon dioxide being used as a refrigerant in the cooling vessel. Then upon introducing the sample to the column, volatile fractions in the gas are dissolved in the priming liquid or propane. After being dissolved in the propane, the partial pressures of the volatile fractions are lowered to such an extent that the vapors will condense at the temperature in the reflux chamber. The heavier fractions in the gas sample, such as propane, hexane, etc., are, of course, readily condensible in the reflux tube. In this manner the volatile constituents in this sample may be condensed as the latter is fed into the column; and either during the entry of sample, or after the entire sample has been condensed and retained in the column, separation of the successive constituents for delivery to the receivers may take place in the manner heretofore described. When the fractions of higher volatility than propane have been separated, a propane constituent containing that utilized as the priming liquid and also the propane contained in the gas sample, is separated, and having previously noted the amount of propane used as priming liquid, the propane content of the gas may be calculated from a distillation curve as shown in Figure 7.

In Fig. 7 there is shown a typical graph of results plotted from a distillation in which the fractionated compounds range from methane to n-butane, the amount of vapor distilled, as measured in the receiver, being plotted against the temperature at the fractionating column outlet. The irregular curve illustrated in the graph serves not only to identify and determine the amount of the various fractionated compounds, but also to show the sharpness with which these products were fractionated and their state of purity as produced. Thus when substantially all of a particular fraction, for instance methane, has been distilled off, the curve rises almost vertically to the vaporizing temperature of the next heavier compound in the series, the rise of ethane, the curve between the methane and the ethane plateaus indicating sharp fractionation between these compounds. Also the fact that the various plateaus extend substantially horizontally, indicating constant temperature during their respective vaporization, serves to show that these fractions are produced in substantially a pure state.

From the foregoing description it will be readily understood that my system of analysis applies equally well to the testing of liquids or gases, or mixtures thereof. Also in considering the system as applied to the analysis of gases containing condensible fractions, the analysis of such condensed liquid fractions may be considered to be a step in the procedure of gas analysis, inasmuch as it is necessary to liquefy those constituents of the gas before their successive separation and delivery to the measuring containers.

I claim:

1. The method of quantitatively analyzing a mixed fluid which includes separating constituents of such fluid successively in the vapor phase, discharging said constituents into a container of fixed volume, maintaining said container at a temperature such as to keep its contents in vapor phase, and measuring the pressure change in said vessel resulting from the supply of said constituent thereto.

2. The method of quantitatively analyzing a mixed fluid which includes converting such fluid by thermal interchange into liquid and vapor fractions at a certain suitable pressure and separating the vapor fraction, and passing said vapor fraction into a container of fixed volume at a pressure below said certain pressure, maintaining said container at a temperature such as to keep its contents in vapor phase, and measuring the pressure change in said vessel resulting from the supply of said constituent thereto.

3. The method of quantitatively analyzing a mixed fluid which includes subjecting such fluid to thermal interchange to form separated vapors, rectifying the vapors to separate constituents thereof in the order of their volatility under controlled pressure conditions, and passing the vapor fractions successively into a common container of fixed volume while maintaining therein a pressure below that of rectification of the last vaporized fractions and at temperature such as to keep the contents of the container in vapor phase, and measuring the variations in pressure in said container.

4. The method of quantitatively analyzing a mixed fluid which includes converting constituents of such fluid into separated vapor and rectifying the vaporized constituents at controlled temperature and pressure to separate individual constituents in vapor phase in the order of their volatility, measuring the temperature and pressure of the separated fractionated vapors, and passing the successive vaporized fractions into a container of fixed volume while maintaining temperature and pressure conditions in said container to keep the contents thereof in vapor phase, the pressure in said container being below that of separation of the constituents contained therein, and measuring the variations in pressure in said container.

5. The method of quantitative gas analysis which comprises subjecting the gas to cooling to condense constituents thereof, subjecting the condensate to vaporization and rectification to separate said constituents in the order of their volatility, passing the vaporous constituents into a container of fixed volume and at pressures below the condensation pressure of the vapors, maintaining a temperature in the container to keep the contents thereof in vapor phase, and measuring the pressures in said container resulting from the passage of said constituents thereinto.

6. The method of quantitatively analyzing mixed fluids, which comprises supplying the fluid to be analyzed in a chamber and subjecting it to thermal interchange therein to separate it into liquid and vapor constituents, passing the vapors through an elongated, thermally-insulated conduit, cooling said conduit at its upper portion to permit the passage of individual constituents in vapor phase and to condense and return higher boiling constituents through the conduit to the chamber, placing an evacuated container of fixed volume in communication with the outlet of the conduit whereby flow of the separated vaporized constituent to said container is induced with a rise in pressure proportionate to the amount of said constituent, maintaining the said container at a temperature to keep its contents in vapor phase, and measuring the variations in pressure in said container.

7. The method of quantitative gas analysis which includes passing the gas into a fractionating column and condensing and retaining in the column constituents of the gas during entry of the gas to the column, fractionally vaporizing and rectifying the condensate to successively separate said constituents in the vapor phase, periodically measuring the temperature of the vapors, passing the successive vaporous constituents into a container of fixed volume and at pressures below the condensation pressure of the vapors, maintaining a temperature in the container, to keep the contents thereof in vapor phase and measuring the pressures in said container substantially simultaneous with said temperature measurements.

8. In the method of quantitatively analyzing a mixed fluid in a system consisting of a distilling chamber, an elongated, thermally-insulated, refluxing column connected therewith, and a receiving container of fixed volume connected with the outlet of the conduit, the steps of preliminarily evacuating the distilling chamber, reflux chamber and receiving container, closing the evacuated system, then closing off communication between the receiving container and the outlet of the reflux column to maintain a vacuum in the receiving container, supplying the fluid to be analyzed to the distilling chamber and subjecting it to thermal interchange, whereby constituents of the fluid are vaporized and a pressure is created in the chamber and reflux column higher than in the evacuated receiving container, cooling the reflux column at its upper end to condense and return all but the most volatile constituent of the fluid, opening communication from the outlet of the reflux column to the receiving chamber to a controlled extent, whereby the uncondensed vapor constituent of the fluid is permitted to pass to the receiving chamber, maintaining a temperature in the latter to keep its contents in vapor phase and measuring the pressure in said receiving chamber corresponding to the flow of individual vaporized constituents of the fluid, thereby, whereby the quantities of said constituents are accurately determined.

9. The method of quantitatively analyzing a mixed fluid which comprises separating such fluid into liquid and vapor constituents, rectifying the vapor constituents at controlled temperature and pressure to separate individual constituents thereof in vapor phase in the order of their volatility, passing the successive separated vapor fractions through a controllably restricted opening into a container of fixed volume while maintaining temperature and pressure conditions in said container to keep the contents thereof in vapor phase, the pressure in said container being below that of separation of the constituents contained therein, varying the restricted opening to control the separation of the vapor fractions and measuring the variations in pressure in the container.

10. In apparatus for analyzing fluids, means for separating from a fluid a constituent in vapor form, a container of constant volume to receive said vapor constituent, said container being maintained at a temperature to keep its contents in vapor form, means for conducting the separated vapor constituent of the fluid into the container and means for measuring the increment in pressure within said container to determine the amount of said vapor constituent introduced thereinto.

11. In apparatus for analyzing fluids, means for separating from a fluid a constituent in vapor form, a container of constant volume to receive said vapor constituent, said container being maintained at a temperature to keep its contents in vapor form, means for conducting the separated vapor constituent of the fluid into the container, means for measuring the increment in pressure in said container to determine the amount of said vapor constituent introduced thereinto, means for isolating the container from the separating means and means for initially evacuating the container.

12. In apparatus for analyzing fluids, a fractionating column for separating from a fluid a constituent in vapor form, a container of constant volume, a conduit connecting the vapor outlet of the column with the container to conduct to the latter and retain therein vapor constituents separated in the column, means for maintaining the container at a temperature at which its contents will remain in vapor form and means for measuring the increment in pressure in said container to determine the amount of vapor constituent introduced thereinto.

13. In apparatus for analyzing fluids, a fractionating column for separating from the fluid a constituent in vapor form, a container of constant volume, a conduit connecting the vapor outlet of the column with the container to conduct to the latter and retain therein vapor constituents separated in the column, means for maintaining the container at a temperature at which its contents will remain in vapor form, a control valve in said conduit between the outlet of the column and the container to control the flow of vapor from the former to the latter and means for initially securing in the container a reduced pressure below the pressure at the outlet of the column, whereby, on opening said control valve, the separated vapor constituent from the column is caused to flow into said container with increase of pressure therein, and means for measuring the increment in pressure in the container.

14. In apparatus for analyzing fluids, a fractionating column for separating from a fluid a constituent in vapor form, a container of constant volume, a conduit connecting the vapor outlet of the column with the container to conduct to the latter and retain therein the vapor constituent separated in the column, means for maintaining the container at a temperature at which its contents will remain in vapor form, a valve in said conduit between the outlet of the column and the container to control the flow of vapor from the former to the latter, evacuating means communicating with the container whereby said container may be evacuated, means for closing off communication with said evacuating means, said control valve being operable to permit flow of the separated vapor constituent from the fractionating column to the container with an increment of pressure in the latter corresponding to the amount of vapor constituent, and means for measuring the increase in pressure in the container.

15. In apparatus for analyzing fluids, a fractionating column for separating from a fluid a constituent in vapor form, a container of constant volume, a conduit connecting the vapor outlet of the column with the container, means for measuring the temperature of the vapor constituent passing from the column into the conduit, means for maintaining the contents of the container in vapor form, a valve in said conduit to control the flow of vapor from the column to the container and maintain a desired pressure at the outlet of the column, and pressure indicating means communicating with the conduit at a point between the valve and the container whereby the increment in pressure in the container, due to vapor constituents received therein, may be determined.

16. In apparatus for analyzing fluids, a fractionating column of small volume capacity for effecting precision separation from a fluid of a constituent in vapor form, a container of constant volume, a conduit extending from the outlet of the column to the container to conduct the separated vapor constituent to the latter, a control valve in said conduit, whereby a desired pressure indicating means communicating with and sensitive to the pressure at the outlet of the column, means for initially evacuating the container, means for closing off the evacuating means from the container before directing flow of a vapor constituent from the column to the container, means for maintaining the contents of the container in vapor form, pressure indicating means communicating with and sensitive to the pressure in the container, whereby increments in pressure due to vapor constituents conducted thereinto may be determined.

17. In apparatus for analyzing fluids, means for separating from a fluid successive constituents in vapor form, a container of constant volume to receive said vapor constituents, said container being maintained at a temperature to keep its contents in vapor form, means for conducting the separated vapor constituents of the fluid into the container and means for measuring the increments in pressure within said container to determine the amounts of said vapor constituents introduced thereinto.

18. In apparatus for analyzing fluids, means for separating from a fluid successive constituents in vapor form, a container of constant volume to receive said vapor constituents, said container being maintained at a temperature to keep its contents in vapor form, means for conducting the separated vapor constituents of the fluid into the container, means for measuring the increments in pressure in said container to determine the amount of said vapor constituents introduced thereinto, means for isolating the containers from the separating means and means for initially evacuating the container.

WALTER J. PODBIELNIAK.

CERTIFICATE OF CORRECTION.

Patent No. 2,009,814.  July 30, 1935.

WALTER J. PODBIELNIAK.

It is hereby certified that error appears in the printed specification of the above numbered patent requiring correction as follows: Page 3, first column, line 31, before "by" insert as; and second column, line 61, for "a" read to; page 5, first column, line 61, after "of" insert ethane,; and line 63, strike out the word and comma "ethane,"; and that the said Letters Patent should be read with these corrections therein that the same may conform to the record of the case in the Patent Office.

Signed and sealed this 17th day of September, A. D. 1935.

Leslie Frazer
Acting Commissioner of Patents.

(Seal)